United States Patent
Bonja et al.

(10) Patent No.: US 6,404,961 B1
(45) Date of Patent: Jun. 11, 2002

(54) OPTICAL FIBER CABLE HAVING FIBER IN METAL TUBE CORE WITH OUTER PROTECTIVE LAYER

(75) Inventors: Jeffrey A. Bonja, Avon; Douglas A. Norton, Windsor; Christopher J. Chestnut, Ellington; Robert A. Rubino, Tolland, all of CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/121,468

(22) Filed: Jul. 23, 1998

(51) Int. Cl.⁷ .................................................. G02B 6/44
(52) U.S. Cl. ....................................... 385/109; 385/113
(58) Field of Search ................................. 385/109, 110, 385/113

(56) References Cited

U.S. PATENT DOCUMENTS

| | | | |
|---|---|---|---|
| 4,183,621 A | * 1/1980 | Kao et al. | 385/128 |
| 4,477,147 A | 10/1984 | Winter et al. | 350/96.23 |
| 4,579,420 A | 4/1986 | Winter et al. | 350/96.23 |
| 4,718,747 A | 1/1988 | Bianchi et al. | 385/128 |
| 4,725,122 A | * 2/1988 | Anelli et al. | 385/100 |
| 4,756,596 A | * 7/1988 | Ona et al. | 385/110 |
| 5,199,096 A | * 3/1993 | Kathiresan et al. | 385/109 |
| 5,455,881 A | * 10/1995 | Bosisio et al. | 385/109 |
| 5,917,978 A | * 6/1999 | Rutterman | 385/109 |

FOREIGN PATENT DOCUMENTS

DE      3515228      10/1985      ............ G02B/6/44

* cited by examiner

Primary Examiner—Cassandra Spyrou
Assistant Examiner—Jennifer Winstedt
(74) Attorney, Agent, or Firm—Ware, Fressola, Van Der Sluys & Adolphson LLP

(57) ABSTRACT

A fiber optic cable includes a core and a surrounding protective layer. The core includes an inner tube having one or more optical fibers contained therein, and the surrounding protective layer includes an outer tube received over the inner tube, and a layer of buffer material positioned between the outer tube and the inner tube. The buffer material maintains the inner tube generally centrally located within the outer tube and providing a mechanical link between the inner tube and the outer tube to prevent relative movement therebetween. The inner tube may be coated with a low hydrogen permeability material to minimize the entrance of hydrogen into the inner tube. The low hydrogen permeability material may be coated with a protective layer of hard, scratch resistant material to protect the integrity of the low hydrogen permeability material. The area in the inner tube not occupied by the optical fibers may be filled with a filler material, the filler material being selected to have a sufficient viscosity to resist the shear forces applied to it as a result of the weight of the optical fibers within the tube while allowing movement of the optical fibers within the tube during spooling, deployment and handling of the cable to thereby prevent damage and microbending of the optical fibers. The filling material may be impregnated with a hydrogen absorbing/scavenging material to remove any excess hydrogen within the inner tube. The optical fibers have an excess length with respect to the inner tube, and the cable may include an outer jacket of a high temperature, protective material to protect the cable during handling and installation.

17 Claims, 2 Drawing Sheets

OPTICAL FIBER CABLE HAVING FIBER IN METAL TUBE CORE WITH OUTER PROTECTIVE LAYER

TECHNICAL FIELD

Figure 1:
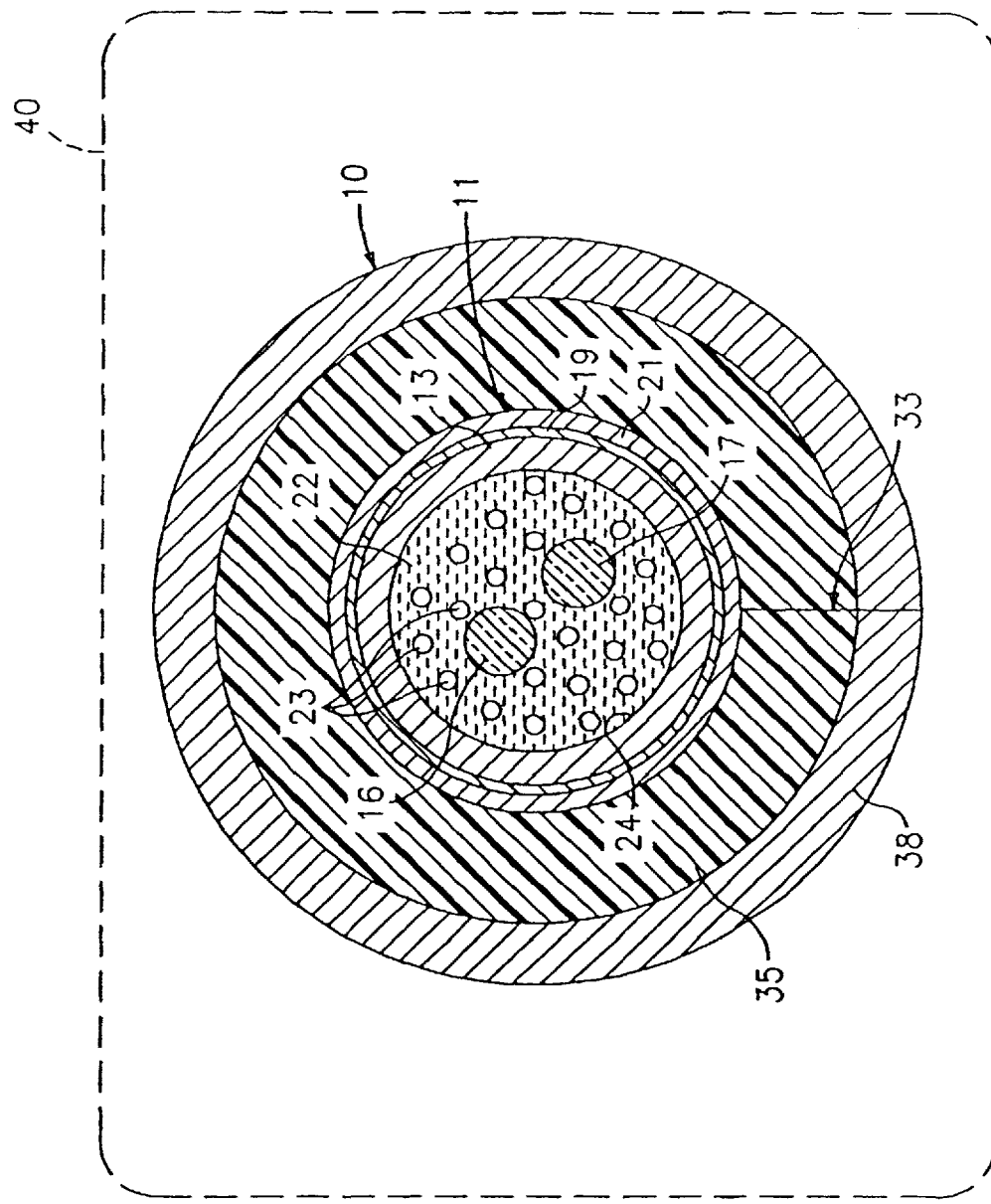

The present invention relates to fiber optic cables, and more particularly, to fiber optic cables for use in harsh environments.

BACKGROUND OF INVENTION

With advancements in the area of fiber optic sensors, particularly for use in harsh environments, such as in oil and gas wells, there is an increasing need for fiber optic cables that can survive harsh environments. For example, the harsh environment encountered in down-hole fiber optic sensing applications places demanding requirements on the design of fiber optical cables for use in the down-hole environment. Such a fiber optic cable may be used to interconnect a down-hole fiber optic sensor with instrumentation located at the surface of a well bore.

Down-hole environmental conditions can include temperatures in excess of 130° C., hydrostatic pressures in excess of 1000 bar, vibration, corrosive chemistry and the presence of high partial pressures of hydrogen. Down-hole applications also lead to the requirement that the fiber optic cable be produced in lengths of 1000 m and longer. Because of the long cable lengths in such applications, the fiber optic cable must be designed to support the optical fiber contained therein from excessive strain associated with the weight of the long length of optical fiber.

The deleterious effects of hydrogen on the optical performance of optical fiber, particularly in sub-sea installations for the telecommunications industry, have long been documented. To protect optical fibers from the effects of hydrogen, hermetic coatings and barriers, such as carbon coatings and the like, have been used to minimize the effects of hydrogen in such sub-sea telecommunications applications. However, at the elevated temperatures experienced in a harsh down-hole environment, such coatings lose their resistance to permeability by hydrogen. Additionally, at such high temperatures, the effects of hydrogen on an optical fiber may be accelerated and enhanced.

Therefore, there exists the need for a fiber optic cable that is suitable for use in such harsh environments.

SUMMARY OF THE INVENTION

An object of the present invention is to provide a fiber optic cable for use in a harsh environment.

A further object of the invention is to provide such a fiber optic cable that minimizes the exposure of optical fibers to hydrogen contained in the harsh environment, particularly at high temperatures.

A still further object of the invention is to provide such a fiber optic cable wherein the optical fibers contained in the cable are not exposed to significant damaging strain over a wide range of operating temperatures.

According to the present invention, a fiber optic cable includes a core and a surrounding protective layer. The core includes an inner tube having one or more optical fibers contained therein, and the surrounding protective layer includes an outer tube received over the inner tube, and a layer of buffer material positioned between the outer tube and the inner tube, the buffer material maintaining the inner tube generally centrally located within the outer tube and providing a mechanical link between the inner tube and the outer tube to prevent relative movement therebetween.

According further to the present invention, the inner tube may be coated with a low hydrogen permeability material to minimize the entrance of hydrogen into the inner tube. According still further to the invention, the low hydrogen permeability material may be coated with a protective layer of hard, scratch resistant material to protect the integrity of the low hydrogen permeability material.

In still further accord with the invention, the area in the inner tube may be filled with a filler material, the filler material being selected to have a sufficient viscosity to resist the shear forces applied to it as a result of the weight of the optical fibers within the tube while allowing movement of the optical fibers within the tube during spooling, deployment and handling of the cable to thereby prevent damage and microbending of the optical fibers. According still further to the present invention, the filling material may be impregnated with a hydrogen absorbing/scavenging material.

According further to the invention, the optical fibers have an excess length with respect to the inner tube. According further to the invention, the cable may include an outer jacket of a high temperature, protective material to protect the cable during handling and installation.

The fiber optic cable of the present invention provides a significant advantage over the prior art. The cable provides significant resistance to the damage effects of hydrogen on an optical fiber by minimizing the exposure of the optical fibers to hydrogen. The inner tube of the cable is coated with a low hydrogen permeability material to limited the ingress of hydrogen into the inner tube. Additionally, the filling material within the inner tube is impregnated with a hydrogen absorbing/scavenging material to remove any hydrogen that may enter the inner tube. A protective coating is received over the low hydrogen permeability material to maintain the integrity of the coating for handling and manufacturing of the cable. To provide a high strength cable capable of deployment in a harsh environment, the inner tube is surrounded by a protective layer that includes a buffer material surrounded by an outer tube.

The foregoing and other objects, features and advantages of the present invention will become more apparent in light of the following detailed description of exemplary embodiments thereof, as illustrated in the accompanying drawings.

DESCRIPTION BRIEF OF THE DRAWINGS

Figure 2:
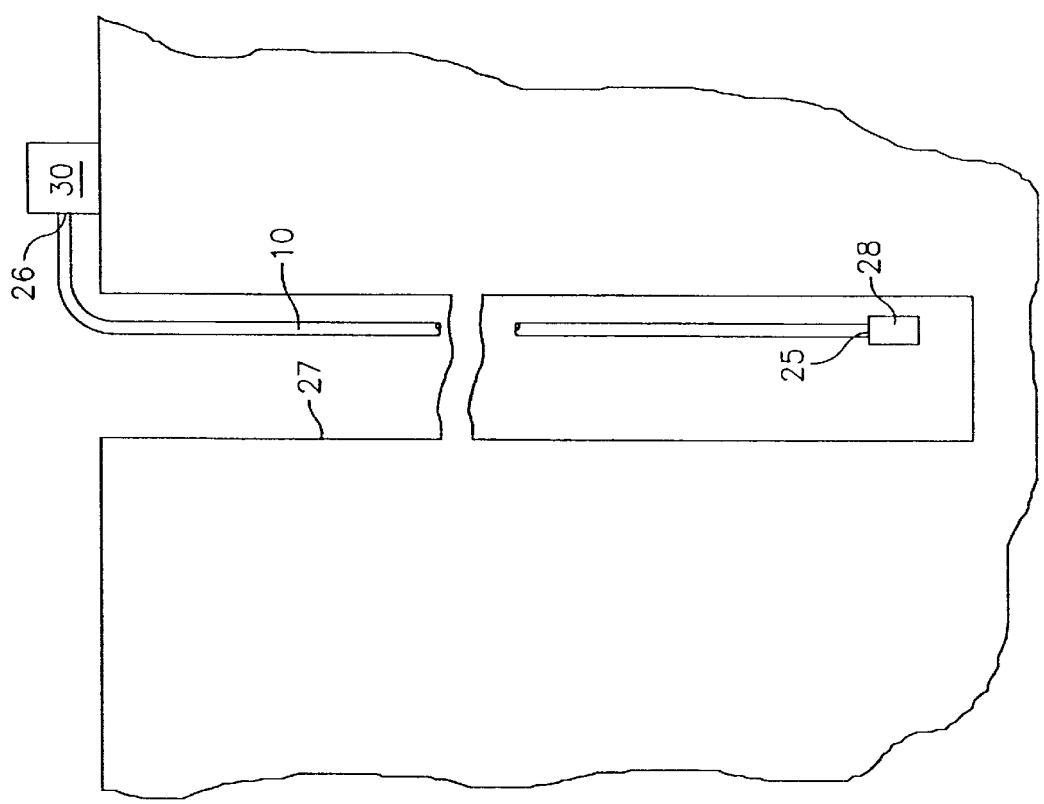

FIG. 1 is a cross-sectional view of the fiber optic cable of the present invention; and FIG. 2 is a perspective view of the fiber optic cable of FIG. 1 within a well bore of an oil and/or gas well.

DETAILED DESCRIPTION OF THE INVENTION

Referring now to FIG. 1, a fiber optic cable 10 manufactured in accordance with the present invention includes a fiber in metal tube (FIMT) core 11 having an inner tube 13 surrounding one or more optical fibers 16, 17. The inner tube 13 may be a laser welded tube, e.g., a length-wise laser welded tube, manufactured from a corrosion resistant material, such as a corrosion resistant metal alloy. Examples of suitable corrosion resistant metal alloys include, but are not limited to; Stainless Steel 304; Stainless Steel 316; Inconel 625; Incoloy 825. The inner tube 13 diameter may be in the range of 1.1 to 2.6 mm, and in an exemplary embodiment of the invention is 2.4 mm. Although the inner tube is described as being 1.1 to 2.6 mm in diameter, the diameter of the inner tube may vary over a large range, depending upon the materials used and the number of optical fibers to be placed in the inner tube. The inner tube 13 wall thickness is selected to be sufficient for the laser welding process. For example, the inner tube 13 wall thickness for a Stainless Steel 304 tube may be 0.2 mm.

The inner tube 13 is coated or plated with a low hydrogen permeability material coating 19, such as tin, gold, carbon, or other suitable low hydrogen permeability material. The thickness of the coating 19 is selected to provide a barrier to a high partial pressure hydrogen environment. Depending upon the selection of material, the coating thickness may be in the range of 0.1 to 15 microns. For example, a carbon coating may have a thickness as thin as 0.1 microns, while a tin coating may be approximately 1.3 microns in thickness. The coating 19 may be over coating 21 with a protective layer of hard, scratch resistant material, such as nickel or a polymer such as a polyamide. The over coating 21 may have a thickness in the range of 2 to 15 microns, depending on the material.

The inner tube 13 may be filled with a filler material 22, to generally fill the void spaces within the inner tube 13 not occupied by the optical fibers 16, 17. The filler material 22 supports the optical fibers 16, 17 within the inner tube 13. The filler material 22 is selected to have sufficient viscosity so as to resist the shear forces applied to it as a result of the weight of the fiber in a vertical well installation to thereby provide the desired support for the optical fibers 16, 17 over the entire operating temperature range of the cable 10, including temperatures typically in the range of 10° C. to 200° C. However, the cable may be used over a wider temperature range, depending on the selection of materials, primarily related to the buffer material 35 and coatings on the optical fibers 16, 17. Additionally, the filler material 22 must allow the optical fibers 16, 17 to relax and straighten with respect to the inner tube 13 due to differences in the coefficients of thermal expansion between the optical fiber 16, 17 and the inner tube 13 and during spooling and deployment of the cable 10. The viscosity of the filler material may widely vary, depending on the specific cable design, including the diameter of the inner tube and the number of fibers in the inner tube. The filler material 22 also provides additional benefits of preventing chaffing of the coatings on the optical fibers 16, 17 as a result of bending action during installation and vibration of the cable 10. Another advantage is that the filler material 22 serves as an integrator of inner tube surface roughness to avoid microbend losses in the optical fibers 16, 17. Suitable filler materials include standard thixotropic gel or grease compounds commonly used in the fiber optic cable industry for water blocking, filling and lubrication of optical fiber cables.

To further reduce the effects of hydrogen on the optical fibers 16, 17, the filler material 22 may be impregnated with a hydrogen absorbing/scavenging material 23, such as palladium or tantalum. Alternatively, the inner surface 24 of the inner tube 13 may be coated with the hydrogen absorbing/scavenging material, or such material may be impregnated into the tube material.

Referring also to FIG. 2, the cable 10 of the invention may be used in the wellbore 27 of and oil and/or gas well. The optical fibers 16, 17 are selected to provide reliable transmission of optical signals between the ends 25, 26 of the cable 10, such as between a fiber optic sensor 28 positioned within the wellbore 27 and optical signal processing equipment 30. Suitable optical fibers include low defect, pure silica core/depressed clad fiber. Alternatively, suitable fibers include germanium doped single mode fiber or other optical fiber suitable for use in a high temperature environment. Both fibers 16, 17 may be of the same type or of different types. Although the invention is described herein as using two optical fiber 16, 17 within the inner tube 13, it will be understood by those skilled in the art that one or more fibers may be used. The total number of fibers within the inner tube 13 is limited by the diameter of the inner tube such that sufficient space is provided within the inner tube to prevent microbending of the optical fibers 16, 17 during handing and deployment of the cable 10.

The core 11 is surrounded by an outer protective layer 33 that includes a buffer material 35 and an outer tube 38. The buffer material 35 provides a mechanical link between the inner tube 13 and the outer tube 38 to prevent the inner tube 13 from sliding under its own weight within the outer tube 38. Additionally, the buffer material 35 keeps the inner tube 13 generally centered within the outer tube 38 and protects the inner tube and coating from damage due to vibration. Suitable buffer materials include high temperature polymers, such as Fluoroethylenepropylene (FEP), Ethylenechlorotrifluoroethylene (ECTFE), Polyvinylidene fluoride (PVDF), perfluor alkoxy (PFA), TEFLON, TEFLON PFA, TETZEL, or other suitable materials. The buffer material 35 is first applied over the inner tube 13 after laser welding and coating/plating, and then the outer tube 38 is welded over the buffer material and is either drawn down onto a compressible buffer material 35, or the buffer material is expanded during a post laser weld thermal process. The outer tube 38 may be TIG welded, laser welded, or any other suitable process for joining the outer tube 38 over the buffer material 35 may be used. In the case of a compressible buffer material received between a 2.4 mm diameter inner tube and a 0.25 inch (6.345 mm) outer tube as illustrated in the exemplary embodiment of FIG. 1, the buffer material should have a thickness in the range of 0.183 inches (4.65 mm) and 0.195 inches (4.95 mm), and preferably 0.189 inches (4.80 mm). Although a range of buffer material thickness is described with respect to the exemplary embodiment of FIG. 1, any suitable thickness of buffer material may be used, depending of the dimensions of the inner tube and outer tube, to provide the desired mechanical protection of the inner tube and/or to provide the mechanical linkage between the inner tube and the outer tube to prevent relative movement therebetween.

The outer tube 38 is manufactured of a corrosion resistant material that easily diffuses hydrogen. For example, the outer tube is manufactured of the same material of the inner tube 13, without the low hydrogen permeability coating or hydrogen scavenging material. The outer tube 38 is provided in a standard diameter (after draw down if applicable), such as quarter-inch tubing (6.345 mm), and may have a diameter in the range of 4 to 10 mm. The outer tube 38 may have a wall thickness in the range of 0.7 to 1.2 mm.

The fiber optic cable 10 must be capable of operation over a wide range of temperatures, for example between 10° C. and 200° C. In particular, the cable must account for the differential thermal coefficient of expansion (TCE) represented by the optical fibers 16, 17 and the inner tube 13. Without accounting for the differential TCE, long term stress of greater than 0.2% may be applied to the optical fibers 16, 17 over the operating temperature range of the cable. Such stress can lead to premature mechanical failure because of stress corrosion of the fibers 16, 17. To reduce the long-term stress applied to the optical fibers 16, 17 as a result of installation into a high temperature environment, the inner tube diameter is selected to be large enough to support an excess length or "serpentine over-stuff" of optical fiber within the inner tube 13. This excess length may be achieved by controlling the temperature rise of the inner tube material during laser welding of the inner tube 13. The temperature is controlled such that it approximates the anticipated maximum or normal operating temperature of the final installation. This process will lead to an excess length of fiber within the inner tube upon cooling of the inner tube. An excess length of up to 2.0% has been achieved using such method.

To further protect the cable 10 during handling and installation, a protective jacket 40 of a high strength, protective material may be applied over the outer tube 38. For example, a jacket of Ethylene-chlorotrifluoroethylene (ECTFE) may be applied over the outer tube 38 in a generally rectangular configuration to aid in the handling and deployment of the cable 10. Other materials, such as Fluoroethylenepropylene (FEP), Polyvinylidene fluoride (PVDF), Polyvinylchloride (PVC), HALAR, TEFLON PFA, or other suitable materials may be used as the protective jacket 40.

Although the invention has been described and illustrated with respect to exemplary embodiments thereof, the foregoing and various other additions and omissions may be made therein and thereto without departing from the spirit and scope of the present invention.

We claim:

1. A fiber optical cable for use in harsh environments, such as oil and gas wells, which have temperatures in a range of 10 to 200 degrees Celsius, comprising:

a fiber in metal tube core (11) having one or more optical fibers (16, 17) positioned within an inner metal tube (13) made from a corrosion resistant metal material and having a low hydrogen permeability material coating (19) thereon to minimize the entrance of hydrogen into the inner metal tube (13); and an outer protective layer (33) surrounding the inner metal tube (13), having a buffer material (35) and an outer metal tube (38), the buffer material (35) including high temperature polymers for providing a mechanical link between the inner metal tube (13) and the outer metal tube (38) to prevent relative movement between the inner metal tube (13) and the outer metal tube (38), including sliding under its own weight within the outer metal tube (38), and for protecting the inner metal tube (13) and low hydrogen permeability material coating (19) from damage due to vibration, the buffer material (35) being a compressible buffer material having a thickness in a range of 4.65 to 4.95 millimeters, the outer metal tube (38) surrounding the buffer material (35) and being made from a corrosion resistant metal material.

2. A fiber optic cable according to claim 1, wherein the inner metal tube (13) has a diameter of about 2.4 millimeters; and wherein the outer metal tube (38) has a diameter of about 6.3 millimeters.

3. A fiber optic cable according to claim 2, wherein the outer metal tube (38) has a wall thickness in a range of 0.7 to 1.2 millimeters.

4. A fiber optic cable according to claim 1, wherein the low hydrogen permeability material coating (19) has a thickness in a range of 0.1 to 15 microns to provide a barrier to a high partial pressure hydrogen environment.

5. A fiber optic cable according to claim 4, wherein the low hydrogen permeability material coating (19) is either tin, gold or carbon.

6. A fiber optic cable according to claim 1, wherein the inner metal tube (13) has an inner surface (24) coated with a hydrogen absorbing/scavenging material.

7. A fiber optic cable according to claim 1, wherein the inner metal tube (13) has an inner surface (24) coated with a hydrogen absorbing/scavenging material.

8. A fiber optic cable according to claim 1, wherein the inner metal tube (13) is impregnated with a hydrogen absorbing/scavenging material.

9. A fiber optic cable according to claim 1, wherein the low hydrogen permeability material coating (19) has a protective layer of hard, scratch-resistant material overcoating (21).

10. A fiber optic cable according to claim 9, wherein the protective layer of hard, scratch-resistant material overcoating (21) is either nickel or a polymer such as polyamide.

11. A fiber optic cable according to claim 9, wherein the protective layer of hard, scratch-resistant material has a thickness in a range of 2–15 microns.

12. A fiber optic cable according to claim 1, wherein the fiber in metal tube core (11) has a filler material (22) in the inner metal tube (13).

13. A fiber optic cable according to claim 12, wherein the filler material (22) includes standard thixotropic gel or a grease compound for water blocking, and lubrication of the optical fibers (16, 17).

14. A fiber optic cable according to claim 12, wherein the filler material (22) is selected to have a sufficient viscosity to resist the shear forces applied to the filler material (22) as a result of the weight of the optical fibers (16, 17) within the inner metal tube (13) to generally maintain the position of the optical fibers (16, 17) within the inner metal tube (13) and to allow movement of the optical fibers (16, 17) within the inner metal tube (13) during movement of the fiber optic cable.

15. A fiber optic cable according to claim 1, wherein the optical fibers (16, 17) have an excess length with respect to the inner metal tube (13).

16. A fiber optic cable according to claim 1, further comprising an outer jacket (40) of protective material surrounding the outer metal tube (38) for protecting the fiber optic cable during installation and handling.

17. A fiber optic cable according to claim 1, wherein the buffer material (35) comprises Fluoroethylenepropylene, Ethylene-chlorotrifluoroethylene, Polyvinylidene fluoride, perfluoralkoxy, or polytetrafluoroethylene.

* * * * *

UNITED STATES PATENT AND TRADEMARK OFFICE
CERTIFICATE OF CORRECTION

PATENT NO.   : 6,404,961 B1                                                               Page 1 of 1
DATED        : June 11, 2002
INVENTOR(S)  : Jeffrey A. Bonja et al.

It is certified that error appears in the above-identified patent and that said Letters Patent is hereby corrected as shown below:

<u>Column 2,</u>
Line 26, "damage" should be -- damaging --.
Line 29, "limited" should be -- limit --.
Line 45, "DESCRIPTION BRIEF" should be -- BRIEF DESCRIPTION --.

<u>Column 3,</u>
Line 60, "and" should be -- an --.

Signed and Sealed this

Twenty-fifth Day of February, 2003

JAMES E. ROGAN
*Director of the United States Patent and Trademark Office*